United States Patent [19]

Burton, Jr.

[11] Patent Number: 5,506,821
[45] Date of Patent: Apr. 9, 1996

[54] OPTICAL DISK PROGRAM REPEATER

[75] Inventor: Clayton B. Burton, Jr., Tampa, Fla.

[73] Assignee: Applied Media Technologies Corporation, Tampa, Fla.

[21] Appl. No.: 67,604

[22] Filed: May 27, 1993

[51] Int. Cl.⁶ ........................................................ G11B 7/00
[52] U.S. Cl. .................... 369/32; 369/4; 369/33
[58] Field of Search ................................ 369/4, 1, 2, 3, 369/5, 47, 48, 15, 33, 30, 69, 70, 32; 360/12

[56] References Cited

U.S. PATENT DOCUMENTS

| | | | |
|---|---|---|---|
| 4,779,252 | 10/1988 | Custers et al. | 369/32 |
| 4,796,247 | 1/1989 | Vogelsang | 369/33 |
| 4,817,075 | 3/1989 | Kikuchi et al. | 369/47 |
| 4,872,151 | 10/1989 | Smith | 369/33 |
| 4,993,008 | 2/1991 | Shiba | 369/3 |
| 4,996,679 | 2/1991 | Yoshio | 369/32 |
| 5,051,971 | 9/1991 | Yamagishi et al. | 369/32 |
| 5,051,973 | 9/1991 | Shiba et al. | 369/30 |
| 5,063,547 | 11/1991 | Custers et al. | 369/32 |
| 5,168,481 | 12/1992 | Culbertson et al. | 369/30 |
| 5,173,888 | 12/1992 | An | 369/33 |
| 5,228,014 | 7/1993 | d'Alayer de Costemore d'Arc | 369/32 |
| 5,249,166 | 9/1993 | Hamilton et al. | 369/32 |

FOREIGN PATENT DOCUMENTS 4215698  8/1992  Japan .

Primary Examiner—Georgia Y. Epps
Assistant Examiner—Tan Dinh
Attorney, Agent, or Firm—Pettis & McDonald

[57] ABSTRACT

A compact disc player is modified to convert it into a program repeater that plays preselected messages on a repetitive basis. Unused or used information channels in the CD player are employed. A sequence controller which is added to the conventional circuitry controls the operation of the conventional controller. When power is supplied to the CD player, a power monitor activates the sequence controller and the sequence controller then sends control signals to the controller, instructing it to activate the CD player and to place the CD player in its PLAY, AUTO REPEAT, or other preselected modes. The sequence controller also looks for a proprietary code placed on an unused information channel, and sends a deactivation signal to the sequence controller if the code is not found. An internal or external timer may be employed to provide power to the CD player at predetermined times so that the CD player operates as a program repeater entirely without human intervention.

3 Claims, 2 Drawing Sheets

OPTICAL DISK PROGRAM REPEATER

BACKGROUND OF THE INVENTION

1. Field of the Invention

This invention relates, generally, to methods for repeating prerecorded digital audio material or any other digital bitstream. More particularly, it relates to methods for modifying conventional compact disc players to achieve a program repeater function, and to the products of such methods.

2. Description of the Prior Art

Research has shown that businesses can effectively convey advertising and informational messages by playing such material over the public address system while customers are on their premises. Additionally, businesses have found that playing such messages while telephone callers are "on hold" is also effective. These messages might be delivered by a store manager or other personnel, but the cost of such personally delivered, real time advertising is quite high, and there is no way to control the quality of the "performance" of the message.

Accordingly, businesses have adopted the use of prerecorded messages that are continuously played; music is frequently placed in the background to break up the monotony of the spoken voice. Since the prerecorded message is repeated endlessly, devices for playing them are called "program repeaters."

There are numerous other applications for program repeaters. Moreover, the material that is repeated need not be audio data, i.e., there are numerous applications that call for repetition of different types of data streams.

A typical program repeater employs the well known audio cassette tape. For various reasons, such systems produce less than ideal results. The typical cassette tape has a thirty minute maximum capacity per side; thus, the operator is required to rewind the tape every half hour to provide long-term play. More advanced players have an automatic rewind function, but the time spent in rewinding produces a period of silence in the store or over the phone line. Two methods for avoiding the necessity of constant human attendance and rewind time have been developed. Some currently available players automatically reverse themselves and play the opposite side of the tape without human intervention and without any rewinding. Endless- or continous-loop tapes are employed to acheive the same result.

Regardless of which of the above-described methods is employed, due to the physical contact between the tape and the machine's heads and the resultant wear, the lifetime of a continuously-played tape is unacceptably short. Additionally, the maximum length of endless-loop tapes, and hence their playing cycle, is unacceptably short.

Program repeaters are also used to repeat video material. Generally, the same methods described above with respect to audio cassette tapes are available to repeat material on videotapes. In some cases, video tapes are employed to repeat audio-only material. Tapes in video cassette players last longer than audio cassette tapes because the tape surface does not come into physical contact with the tape heads, but the lifetime of an endlessly repeated video tape is still unacceptably short due to the physical wear of endless play.

Finally, there is an additional drawback common to many tape-based program repeaters, whether videotape- or audiotape-based. Many players, upon loss of power, will not automatically re-start themselves when a power is restored. The result is that, when power is interrupted, a not uncommon occurrence, an operator must reset the program repeater. In addition, since operating personnel typically cannot monitor what is being played to telephone callers on hold, a program repeater used for this purpose may be nonfunctional for an extended time before anyone in the business realizes it.

Recent advances in technology have led to the development of program repeaters employing memory chips (typically Dynamic Random Access Memory chips) to store and repeat the program material. Such devices, essentially lacking any moving parts, are free of the physical wear and tear characteristics of the previously-described devices. However, the storage capacity of a reasonably inexpensive DRAM-reliant device is only a few minutes. The sampling rate employed to digitize the audio material for chip storage is typically relatively low, resulting in distortion and poor audio quality. The sampling rate may be increased, but this results in a corresponding reduction in program duration. To allow both a high sampling rate and adequate program length, given the prevailing costs of DRAM memory chips, the amount of memory required would result in an unacceptably high device cost. Still, because of the lack of physical wear, DRAM is currently the technology of choice for program repeaters.

Compact disc players are digital devices that include a source of laser radiation that is directed onto a rotating disc containing digital information. Since the radiation used to read the disc does not cause deterioration, the disc will last indefinitely. The audio quality of CD is unparalleled. CD players are widely available at a reasonable cost, and enjoy high longevity and reliability. These characteristics suggest that compact disc players might be a favorable choice for use as program repeaters.

However, a conventional compact disc stores a maximum of 74 minutes of audio material. In order to acheive continuous play, an operator must restart the player many times during a day. More expensive players may be set to continuously repeat a single disc track or an entire disc. A few players may even allow a sequence of tracks to be programmed to repeat continuously.

However, in the event of a power failure, all CD players lose their play settings and will not automatically reactivate themselves upon restoration of power. Therefore, similar to the situation described previously with respect to tape-based program repeaters, in the event of a power failure, a conventional CD player will lose its settings inadvertently and remain nonoperational for indefinite periods of time until the problem is discovered.

Additionally, the characterisic described in the foregoing paragraph prevents the use of a timer to supply power to the CD player at the beginning of each business day and allow the program repeater to begin functioning automatically. If it is desired that the player run only during limited hours, an operator must set the player in its desired play sequence each day. To avoid such constant operator attention, a conventional CD player must be left on continuously. Its lifespan is therefore unnecessarily shortened.

Thus, according to those of ordinary skill in the field, the future lies in DRAM based devices; the conventional wisdom is that with the passage of time, inventors will eventually produce DRAM chips with increased capacity at lower costs, and that DRAM-based devices will then be perfectly acceptable as program repeaters. Significantly, the conventional wisdom has written off audio and video cassettes and compact disc players for the reasons given above.

Clearly, then, when the prior art is viewed as a whole as required by law, there is no indication that the future of program repeaters lies with compact disc players. Just as importantly, nothing in the art suggests how a conventional compact disc player could be modified to reactivate itself in the event of a power failure. Even more importantly, the very suggestion that a compact disc player could be modified to reactivate itself upon restoration of power after an interruption is not found in the prior art.

SUMMARY OF THE INVENTION

Pulse Code Modulation (PCM) techniques are used to store information in the memory means of compact disc players. These techniques include generation of data streams representing multiple audio channels, supervisory information such as track length in minutes and seconds, error detection and correction, identification codes, clock signals, and the like.

The demodulation process is performed by chip sets on a circuit board; these chip sets perform multiple tasks, interactively communicate with each other, and provide control signals to subordinate peripheral function devices.

Differing chip sets are used by different CD player manufacturers, but all chip sets, despite their differences, perform the same demodulation and processing tasks required by industry standards.

Industry standards for CD player encoding require the provision of subcode data channels. Subcode data blocks that use these channels are time-multiplexed into the composite data stream; these data blocks enable the CD player to perform various functions such as displaying elapsed time, recognizing tables of contents, supporting the front panel displays, and the like.

Currently, these subcode data channels are designated in the industry by the letters P,Q,R,S,T,U,V, and W. However, in current audio format, the only channels that are typically decoded for use are the P and Q channels. Thus, the chip sets in common use typically have available pins allowing access to those channels; for example, pins designated as Q-Data and Q-Clock provide access to the information and synchronization, respectively, necessary to extract the intelligence encoded into the Q channel. The present invention utilizes those pins, but the P-Data and P-Clock pins, or the remaining typically unused pins could be used just as well.

More particularly, the present invention includes a circuit board which is added to a conventional CD player. The novel circuit board monitors the Q data channel of the conventional mother board, although it should be understood from the outset that any of the other subcode data channels would be monitored if the CD player to be modified includes the needed data on a channel other than the Q data channel.

The novel circuit board includes a power filter that supplements the existing CD player power supply, a power-up reset detector, additional audio power amplifiers, and a micro-controller means that monitors the Q data channel, decodes Q data, makes control decisions based upon the decoded information, and generates control signals. The micro-controller means includes a sequence controller and a subcode monitor means for the data encoded into the Q subcode data channel.

An internal or external timer device is programmed to supply power to the device in accordance with a predetermined schedule (for example, to correspond with the business day). The sequence controller, upon receiving said power, activates the device and places it into the auto repeat mode by commanding the controller of the unit to carry out said tasks. Thus, the program repeater system operates completely unattended. A conventional, battery-operated power backup is provided to prevent loss of the timer settings in the event of a power failure. Alternatively, nonvolatile semiconductor memory is provided. Hardware in the form of a switch or software may enable the user to select which tracks on the disc are to be repeated. If software is employed, the selection data must be stored in nonvolatile memory or backed up in some manner.

This disclosure also teaches that a proprietary code may be stored in an unused subcode channel when a disc is mastered, and the monitor may be programmed to search for said code whenever the player is activated and to deactivate the player if the code is not found. In this way, the manufacturer of the disc may ensure that the only material played on the modified CD player will be that material authored or otherwise authorized by the manufacturer.

It should therefore be understood that the primary object of this invention is to provide the world's first program repeater that reactivates itself upon input of power thereinto and which places itself into its auto-repeat mode upon said activation, thereby enabling attendant-free operation.

A closely related object is to accomplish the primary object by means of an inexpensive compact disc player.

Another important object is to disclose a method whereby a manufacturer of compact discs may prevent unauthorized messages from being reproduced by said player. These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
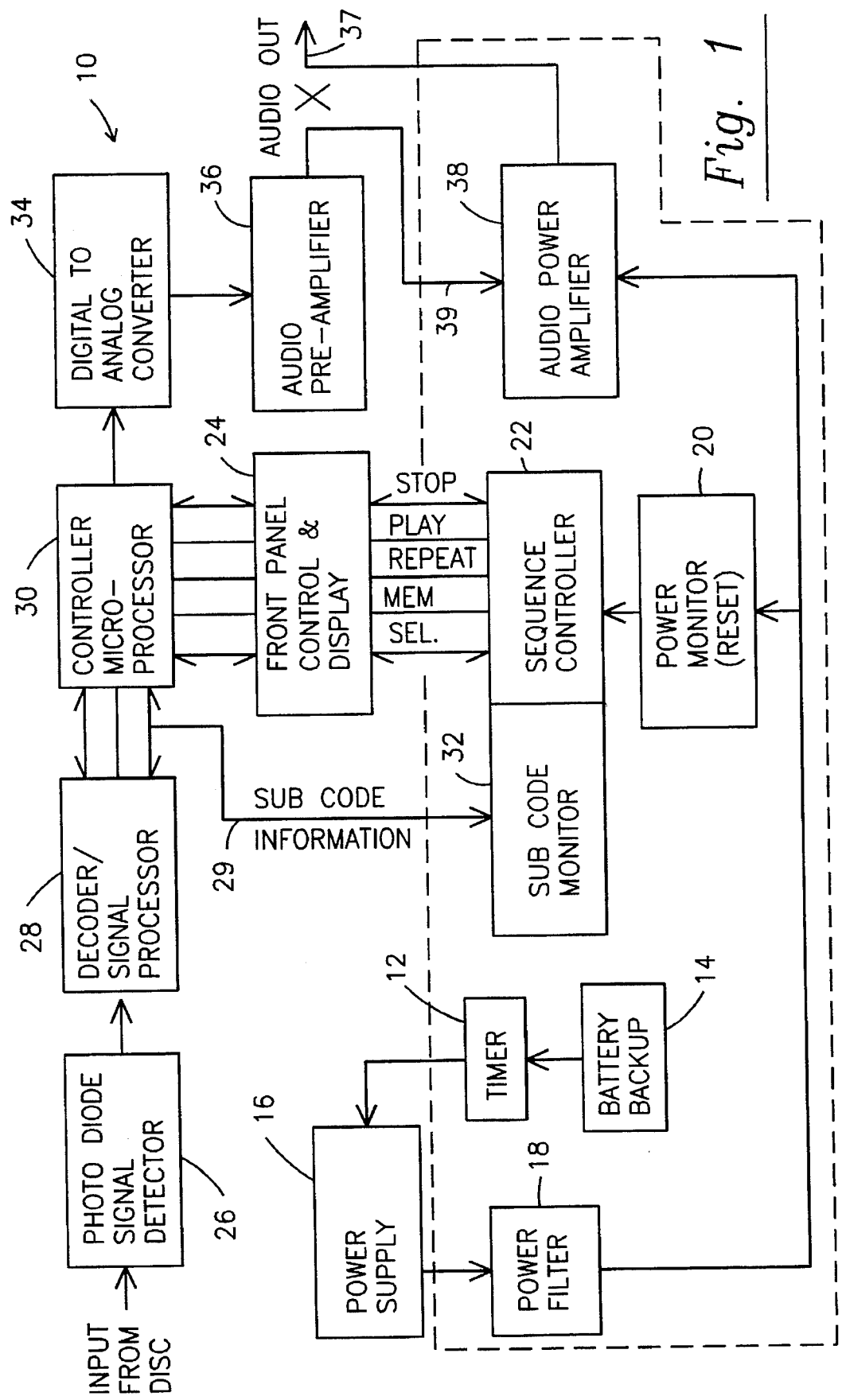
FIG. 1 is a block diagram showing an illustrative embodiment of the novel CD player sequencer.

Referring now to FIG. 1, it will there be seen that a block diagram depicting the circuitry of a digital optical disc player modified in accordance with the teachings and suggestions of this disclosure is denoted as a whole by the reference numeral 10.

The elements outside the dotted box are the pertinent parts of a conventional digital optical disc player, also known as a CD (compact disc) player, and the elements within the box are the parts added thereto by this invention.

A timer device 12, having a battery backup means 14, is connected to conventional power supply 16 and activates it in accordance with a schedule set by the owner of program repeater 10; the conventional AC leads, rectifying and filtering means are not shown to simplify the drawing and because such parts form no part of the invention, per se. An additional power filter means 18 is provided to isolate load fluctuations caused by the addition of additional circuit elements.

When power is applied to the CD player, a power monitor 20 generates a signal that is applied to sequence controller 22. Upon receipt of that signal, the sequence controller 22 initiates a series of control signals that control front panel operations; more particularly, those control signals are applied to the conventional controller means 24 and include signals relating to the STOP, PLAY, REPEAT, MEMORY, SELECT, and the like functions. Thus, the CD player begins playing a previously programmed series of tracks and repeats that series until power is removed. Thus, sequence controller 22 overrides the conventional controller means 24 and commands it to perform the same steps that a human operator would perform to place the CD player into its program repeater mode. Different CD players have different panel switches and different modes, so the exact sequence of control operations may differ as between differing CD players.

Thus, whenever a power outage occurs, power monitor 20 restarts the sequence controller 22 immediately upon restoration of power, and said sequence controller 22, by controlling conventional controller means 24, places the player back into its program repeat mode. In this manner, the program repeater is brought back into service without human intervention and an important object of this invention is achieved.

Upon completion of the startup sequence, i.e., when the CD player begins playing, Photo Diode Signal Detector 26 sends serial data to Decoder/Signal Processor 28; that unit performs functions such as demodulation, synchronization, error correction, subcode processing, and the like. The subcode information extracted by the Decoder/Signal Processor 28 is sent to Controller/Microprocessor 30 and over connection 29 to the novel subcode Monitor 32. Monitor 32 looks for a proprietary code, i.e., a predetermined series of characters that are embedded at predetermined intervals in the subcode information, and sends a shutdown signal to sequence controller 22 if the series of characters is not found within a predetermined period of time. This prevents the play of unauthorized discs and hence unauthorized material.

The novel apparatus also modifies the conventional audio output means. Digital signals from microprocessor 30 are converted to analog format by Digital-to-Analog Converter 34, and the analog signals are fed to Audio Pre-Amplifier 36. The conventional audio out line 37 is cut and the audio signals are routed over connection 39 to Audio Power Amplifier 38 which filters and amplifies said signals. It has the capability of adjusting the output power, i.e., the volume control, and has the further capability of selecting between eight or six hundred Ohms output impedance. The amplified and filtered audio signals are then returned to the conventional audio out line 37.

Figure 2:
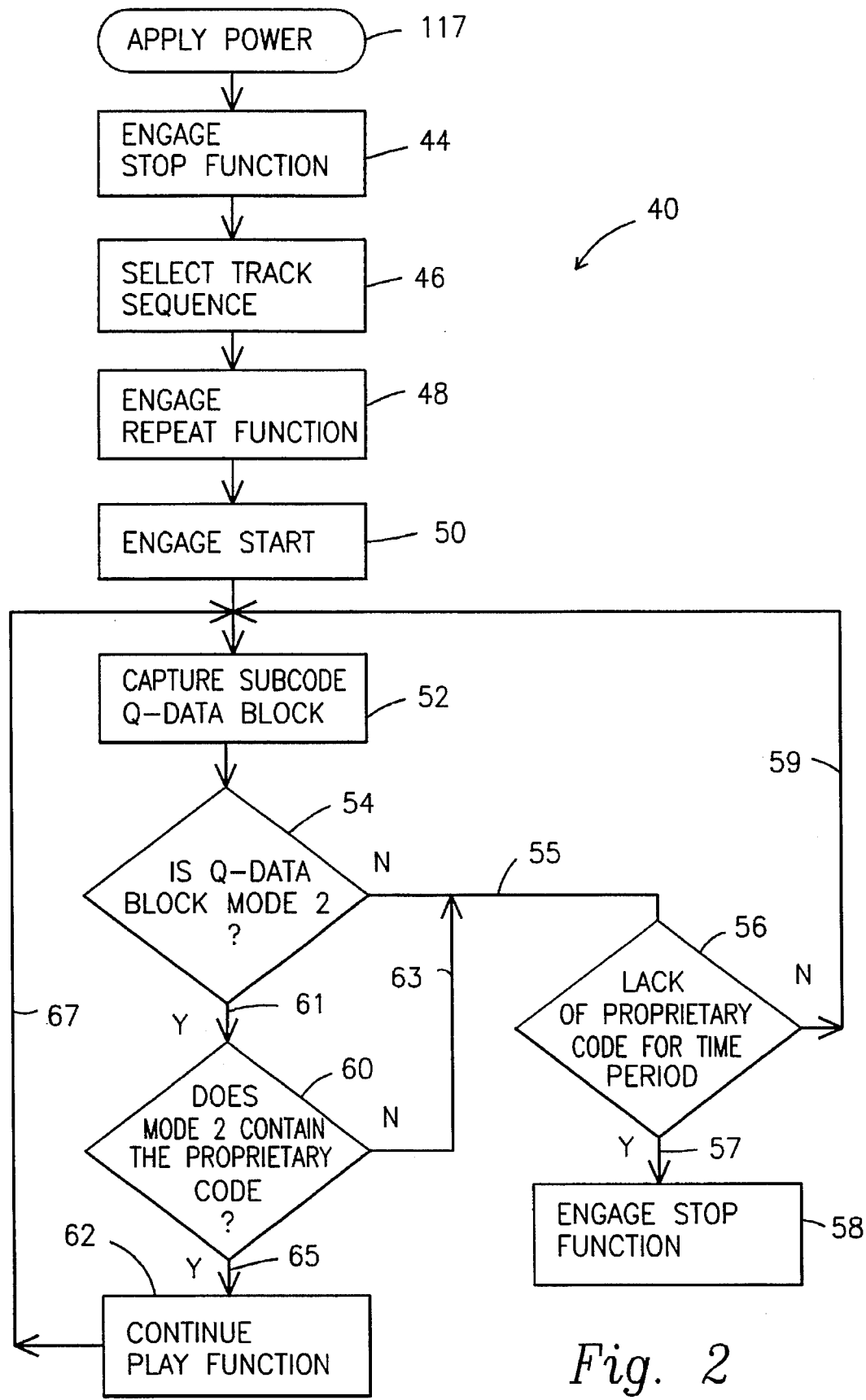
FIG. 2 is a flowchart depicting the steps of the novel method.

Referring now to FIG. 2, it will there be seen that a flow chart that discloses the novel steps of the inventive method is denoted 40 as a whole. The program begins with APPLY POWER start block 42 and flows to function block 44 where the ENGAGE STOP FUNCTION is carried out if the above-mentioned proprietary code is not detected within the predetermined time.

The program then flows to SELECT TRACK SEQUENCE function block 46 where that function is performed. For example, the program might direct the player to play tracks one through nine in that sequence.

After the select track sequence function has been performed, the program flows to ENGAGE REPEAT FUNCTION function block 48. This instructs the Sequence Controller 22 to send a signal to the Front Panel Control and Display means 24 (the conventional controller means) to place the CD player in its REPEAT mode.

The program then flows to the ENGAGE START function block 50; this step of the program directs Sequence Controller 22 to send a signal to controller means 24 to start the CD player.

The subcode monitor 32 is then directed by Sequence Controller 22 to capture the subcode Q-Data arriving over line 29 from Decoder/Signal Processor 28, as indicated by function block 52. Upon completion of that task, the program flows to decision block 54. If the Q-Data Block is not in Mode 2 (Mode 1 is TOC, Mode 2 is catalog number, and Mode 3 is copyright date/CRC, all of said modes being different areas of the Q subcode channel), the program follows NO path 55 to decision block 56. If the proprietary code is not found within the predetermined time period, the program follows YES path 57 to ENGAGE STOP FUNCTION at function block 58 and the CD player is shut down. If the proprietary code for the pertinent time period is found, the program follows NO path 59 and returns to the input of function block 52.

If the Q-Data is in Block Mode 2, the program follows YES path 61 to decision block 60 where the decision is made as to whether Mode 2 contains the proprietary code. If it does not, the program follows NO path 63 to the input 55 of decision block 56. If it does, the program follows YES path 65 to function block 62 labeled CONTINUE PLAY FUNCTION where the program instructs the sequence controller 22 to cause the controller 24 to perform that function. At the conclusion of each play, the program follows path 67 to the input of CAPTURE SUBCODE Q-DATA BLOCK function block 52 and the process described above is repeated.

This invention is clearly new and useful. Moreover, it was not obvious to those of ordinary skill in this art at the time it was made, in view of the prior art considered as a whole as required by law.

This invention pioneers the art of self-activating CD player-based program repeaters. Accordingly, the claims that follow are entitled to broad interpretation, as a matter of law, to protect from piracy the heart or essence of this breakthrough invention.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A program repeater system that operates without human intervention comprising:

an optical disc player comprising a disc player controller in said disc player, said disc player comprising an auto-repeat mode;

a sequence controller conductively coupled to said disc player controller, said sequence controller comprising a predetermined set of instructions, said set of instructions including instructions to activate the disc player and to place said disc player into said auto-repeat mode;

a power monitor conductively coupled to said sequence controller so that power is applied to said sequence controller upon delivery of power to said disc player after a power interruption, said sequence controller sending said predetermined set of instructions to said disc player controller in response to the supply power to said sequence controller;

an optical disc comprising at least on sub-code channel;

a predetermined proprietary code comprising a predetermined series of characters stored at pre-determined intervals in said sub-code channel; and a disc output monitor for monitoring the output from said optical disc while it is played in said disc player, said disc output monitor causing the disc player to become dysfunctional if said proprietary code is not found.

2. The program repeater of claim 1, further comprising a programmed timer device, such that said timer device operates said disc player in accordance with a predetermined timing schedule.

3. The program repeater of claim 1 further comprising an optical disc; and means for searching for a proprietary code upon insertion of said disc into said disc player, and for instructing said sequence controller to cause said disc player to become dysfunctional if said proprietary code is not found within a predetermined period of time.

* * * * *

UNITED STATES PATENT AND TRADEMARK OFFICE
CERTIFICATE OF CORRECTION

PATENT NO. : 5,506,821
DATED : APRIL 9, 1996
INVENTOR(S) : CLAYTON B. BURTON, JR.

It is certified that error appears in the above-indentified patent and that said Letters Patent is hereby corrected as shown below:

Claim 1, Column 7, line 4, delete "on" and insert therefor --one--.

Signed and Sealed this

First Day of October, 1996

Attest:

BRUCE LEHMAN

Attesting Officer

Commissioner of Patents and Trademarks